United States Patent
Beer

[15] 3,688,290
[45] Aug. 29, 1972

[54] TELEMETERING SYSTEM
[72] Inventor: Palle-Finn Beer, Lidingo, Sweden
[73] Assignee: AGA Aktiebolag, Lidingo, Sweden
[22] Filed: March 19, 1971
[21] Appl. No.: 126,060

[30] Foreign Application Priority Data
March 24, 1970 Sweden............................3980

[52] U.S. Cl. ....................340/195, 324/179, 331/165
[51] Int. Cl. ............................................G08c 19/26
[58] Field of Search ......340/195, 192; 324/174, 179; 331/165

[56] References Cited
UNITED STATES PATENTS 2,907,991  10/1959  Allen..........................340/195
2,918,666  12/1959  Brower.......................340/195

*Primary Examiner*—Thomas B. Habecker
*Attorney*—Larson, Taylor & Hinds

[57] ABSTRACT

A telemetering system for providing indications of various states of an object, such as its position, motion or rate of rotation. A core of soft magnetic material comprising the inductance of a high frequency tuned circuit is influenced by the magnetic field of a permanent magnet that is affixed to said object and that moves towards and away from the core, respectively, with the magnetic field generated by said permanent magnet premagnetizing said core so as to affect the attenuation of the tuned circuit, thereby influencing an output signal that comprises an indication of a measured value, i.e., indication of the state of said object.

3 Claims, 1 Drawing Figure

PATENTED AUG 29 1972
3,688,290
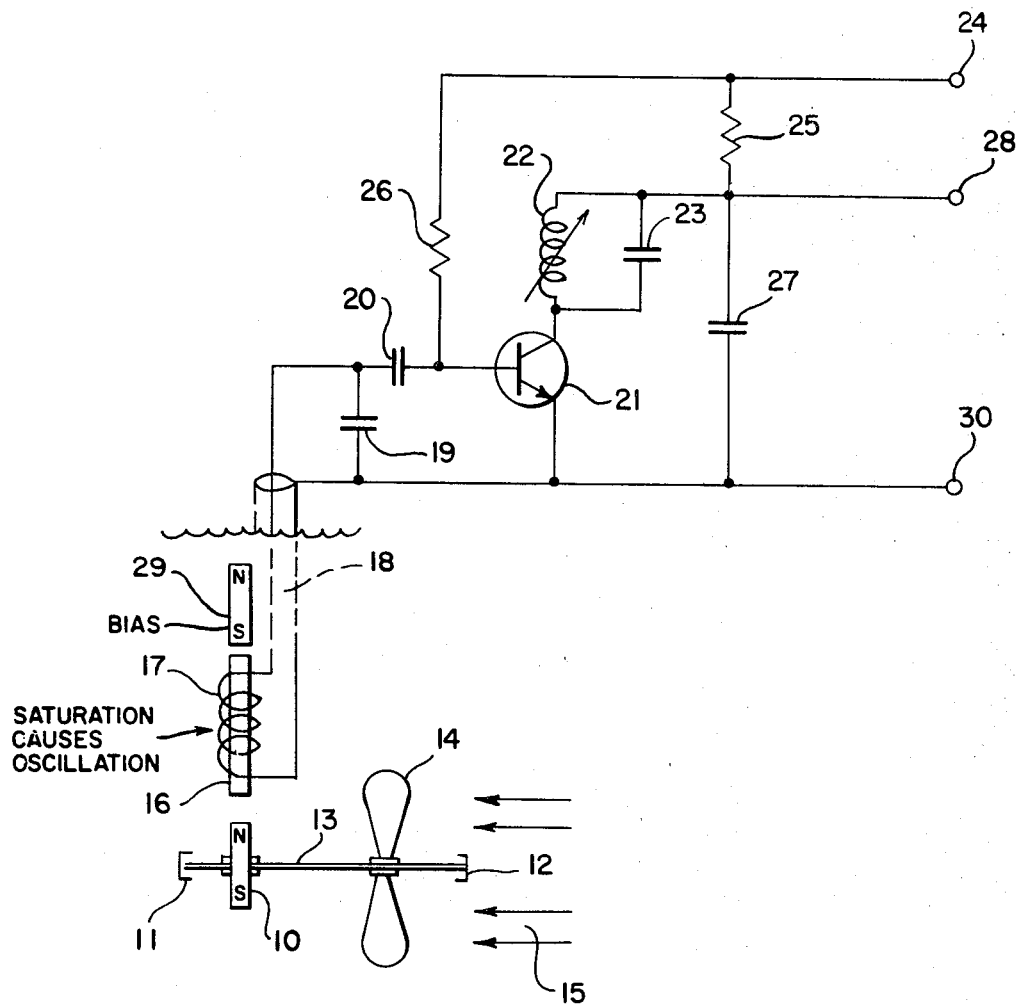
INVENTOR
PALLE-FINN BEER
BY  *Larson, Taylor and Hinds*
ATTORNEYS 3,688,290

TELEMETERING SYSTEM

BACKGROUND OF THE INVENTION.

1. Field Of The Invention.

This invention refers to a telemetering system for indicating various states of an object, such as its position, motion or rate of rotation. In this connection, it is assumed that the object is affixed to at least one magnetic source that generates a magnetic field.

2. Description Of The Prior Art.

Previously known magnetic position-indicating transducers operate on one of many physical principles, for example an attraction force on a movable contact, voltages from a Hall generator element, or resistance changes in a so-called field plate. Unfortunately, applying these principles entails definite disadvantages, such as contact wear, low output power, and the requirement of high field intensity.

SUMMARY OF THE INVENTION.

In contrast to these previously known magnetic transducers, it is a characteristic of the transducer in accordance with the instant invention that it provides high output power as the result of moderate field changes, concurrently with no wear occuring on the transducer.

The invention is characterized in that the magnetic field generated by the magnetic source is adapted to actuate a soft magnetic core which is surrounded by a coil included in a high frequency tuned circuit, with the attenuation of said circuit being an inverse function of the field intensity induced in the core by said transducer. The degree of attenuation of the core is adapted to control the transmission of a telemetering signal.

The transducer in accordance with the invention utilizes the property of a soft magnetic material, such as an alloy of nickel and iron (mu metal), that its high frequency magnetizing losses are influenced by the premagnetization of the material. In accordance with the invention, the magnetizing losses may both be generated and indicated by the soft magnetic material being included as the core of a coil that comprises the inductance of a high frequency tuned circuit. When this core is not subjected to a premagnetization, the circuit will have high attenuation, which corresponds to a very low Q factor in the tuned circuit. If on the other hand the core is subjected to a premagnetization, the attenuation is reduced, which corresponds to an increase of the Q factor of the circuit. The attenuation will have its minimum value when the material has become magnetically saturated. When material of high permeability is used, the state of saturation is reached with moderate magnetic field intensities.

In accordance with the invention, the effect described above is utilized for making a tuned circuit self-oscillate, and cease self-oscillating, respectively, in response to the degree of saturation of the core caused by a permanent magnet being moved towards or away from the core, respectively.

BRIEF DESCRIPTION OF THE DRAWINGS.

The invention will be described more specifically below with reference to the accompanying drawing, which illustrates the system of the invention with amplifying means which may be made to oscillate and which have their oscillating state controlled by a magnetic source In this particular case, the source that generates the magnetic field consists of a permanent magnet 10 which is secured to a shaft 13 that is rotatable in bearings 11, 12. The shaft with the permanent magnet may be made to rotate in arbitrary manner, and as an example the drawing indicates that an impeller 14 is fastened to the shaft and may be rotated by a flow of fluid which is illustrated by means of arrows 15, for example water. The permanent magnet 10 is bipolarly magnetized with the poles N and S as shown in the drawing. The field generated by magnet 10 influences a magnetic core 16 which is surrounded by a coil 17. The coil is connected in parallel with a capacitor 19 over a line 18 which may consist of a coaxial line and forms a high frequency tuned circuit with said capacitor, with said circuit being connected to the input electrodes, i.e., the base and emitter, of a transistor 21 over a capacitor 20. A second high frequency tuned circuit, which consists of a coil 22 and a capacitor 23, is connected to the output of said transistor and may be tuned to approximately the same resonance frequency as the circuit 17, 19. Operating voltage is supplied to the transistor from a terminal 24 over a resistor 25 to the collector via the tuned circuit 22, 23 as well as over a resistor 26 to the base, so that the latter will be provided with an appropriate bias. Finally the output circuit of the transistor 21 with respect to the high frequency generated in the self-oscillation is closed through a capacitor 27, with the junction between this capacitor and resistor 25 being connected to a terminal 28.

The pertinent system operates as follows: When the magnetic field generated by the source magnet 10 premagnetizes the core 16 so as to saturate or nearly saturate said core, the core will have practically no attenuating effect on the tuned circuit circuit 17, 19. Hence the latter will have a very high Q factor. A capacitive coupling occuring in transistor 21 between the collector and the input circuit of said transistor can then cause the transistor to begin to self-oscillate, which is facilitated by the two tuned circuits 17, 19 and 22, 23, respectively, being tuned to the same frequency. Self-oscillation is achieved when one pole, N or S, respectively, of the transducer magnet is directed towards core 16. In the intermediate position the magnetic field of the transducer magnet 10 will not affect the core 16, and as the result of this the premagnetization of the core 16 will be reduced so that it will have a strong attenuating effect on the circuit 17, 19. This will cause the self-oscillation to cease immediately.

This system is highly insensitive to external electromagnetic and mechanical disturbances. Also, it is characterized by the reaction of core 16 on the source magnet 10 being extremely small, with the result that no apparent braking thereof occurs. This is the result of an extremely small change of field being necessary for providing a change in the oscillating state. Furthermore, the system rapidly follows the field changes to which core 16 is subjected, and therefore it is capable of indicating high rotative rates of the source magnet. It may be pointed out simultaneously that the oscillating state of the transistor is responsive to the magnitude of the magnetic field that influences core 16 and not to its rate of change. The system may therefore be utilized for indicating very low rates of rotation and it may also be utilized for providing indications of changes in position. It may be mentioned that this result cannot be achieved by systems having their functions responsive to the voltage induced in a coil.

In the system described above it has been assumed that the transistor is made to begin to self-oscillate and to cease oscillating, respectively, twice per revolution of the transducer magnet 10. However, it is possible to achieve one single change to self-oscillation and out of self-oscillation, respectively, per revolution, for example if core 16 is subjected to an appropriately selected fixed premagnetization. Such premagnetization may be provided by means of a magnet 29 which is indicated by broken lines in the drawing and which may be adjusted such, with respect to core 16, that its effect on the premagnetization of the core may be controlled.

The high frequency generated in the self-oscillation may be utilized directly for providing an indication of the position and rate of rotation, respectively, of the source magnet 10. For doing so, the high frequency oscillating energy may be extracted at the collector of the transistor and may be fed directly or over a high frequency amplifier to an antenna or, if desired, to a high frequency transmission line. Also, the system is capable of transmitting two different voltage levels as an output signal in response to the instantaneous saturation state of core 16. This is based on the following function.

When transistor 21 is not self-oscillating its base will have a positive voltage with respect to the emitter as the result of resistor 26 being connected between terminal 24 and the base. Hence, the transistor will be conductive, and a comparatively heavy current will pass resistor 25 so that a predetermined lower voltage level will be maintained over capacitor 27 and therefore between terminals 28 and 30. When self-oscillation has commenced, the current through transistor 21 and thus also through resistor 25 decreases, and as the result thereof the voltage between terminals 28 and 30 will be set to a higher lever. The difference that thus is created between the voltage levels at terminal 28 will be of such magnitude that it immediately can be utilized directly for providing an indication or for remote transmission of the corresponding measurement value.

The description above has disclosed an embodiment of the invention in which core 16 is influenced by the variable magnetic field of a rotating permanent magnet. However, it may be taken from the above that the invention is not bonded to this specific embodiment and that the system also may be utilized for providing an indication of the position of a magnetic source with respect to core 16. If furthermore a moving object, for example a conveyor line, is provided with a great number of magnets, its motion may be indicated by these magnets passing the core of the tuned circuit one after another and successively making the tuned circuit self-oscillate and cease self-oscillating, respectively.

It is also possible to place core 16 in coil 22, which is included in the output circuit of the amplifier, so as to attenuate said tuned circuit whereby the oscillating conditions of the amplifier will be controlled in response to the magnetic field generated by source 10.

I claim:
1. A telemetering system for indicating various states of an object, such as its location, motion or rate of rotation, comprising
   a. magnetic source means for generating a magnetic field affixed to said object,
   b. soft magnetic core means,
   c. first tuned circuit means including a first coil that surrounds said core means,
   d. amplifier means having an input and an output, respectively, and
   e. second tuned circuit means including a second coil,
   said first tuned circuit means being connected to the input of said amplifier means for making said amplifier means self-oscillate in response to the state of magnetization of said core means caused by said magnetic field and said second tuned circuit means being connected to the output of said amplifier means, with the attenuation of said first tuned circuit means being an inverse function of the field intensity induced in the core means by said source means and with the signal transmitted from the telemetering system being responsive to the degree of attenuation of said core means.

2. A system in accordance with claim 1, wherein said source comprises a permanent magnet which is affixed to a rotatable member and which provides an angularly responsive premagnetization of the core means so as to cause the amplifier means to self-oscillate and to cease self-oscillating, respectively, one or more times per revolution of said rotatable member.

3. A system in accordance with claim 1, wherein a direct current supplied to the amplifier means generates a voltage drop over a resistor which at a terminal to which the resistor is connected provides a voltage with a level responsive to the oscillating state of the amplifier.

* * * * *